Jan. 28, 1969    R. J. DI PAOLO    3,424,157
NURSING NIPPLE WITH FLOW-REGULATING MEANS
Filed Oct. 23, 1965    Sheet 1 of 2

INVENTOR.
ROCCO J. DI PAOLO
BY Joseph Berkowitz
ATTORNEY.

United States Patent Office 3,424,157
Patented Jan. 28, 1969

3,424,157
NURSING NIPPLE WITH FLOW-REGULATING MEANS
Rocco J. di Paolo, 101 Monroe St.,
Massapequa Park, N.Y. 11762
Filed Oct. 23, 1965, Ser. No. 503,647
U.S. Cl. 128—252                                             1 Claim
Int. Cl. A61j *11/00, 17/00*

ABSTRACT OF THE DISCLOSURE

A nursing nipple provided with a bulbous fluid storage chamber and a connecting teat portion having an outlet aperture for the flow of a fluid therethrough. An internally disposed partial partition responsive to external pressure is provided between the bulbous chamber and teat portion for regulating the flow of a fluid between the storage chamber and the teat portion.

---

This invention relates to a nipple and more particularly to a nipple which closely simulates the natural nipple of a human female, and which will closely approximate the functional aspects of the human nipple, particularly for use in connection with the feeding of an infant.

The conventional nursing nipple for infant feeding, because of its anatomically distorted construction, has been found to produce many undesirable effects by its use, which have been quite injurious to the infant. Correction of defects so developed through the use of the conventional nipple feeding may often be difficult, if not impossible, to correct. Because of the variance from the anatomy of the human breast, bottle feeding requires an entirely different set of responses as compared with those normally utilized during natural infant nursing. Such undesirable effects as tongue thrust, perverted swallowing patterns, mouth breathing, lisping, finger sucking and malocclusion are common defects related to the use of the conventional nipple in babyhood.

In natural nursing, the interaction of the lips and the jaw form a vise-like action to squeeze the periphery of the lactiferus sinus, which serves as the collection area for the milk manufactured in the human breast. Additionally, the human nipple is structurally firm and contains the ducts for directing and emitting the milk supply into the mouth of the infant. In the natural nursing pattern, the tongue acts as a guide for the nipple so as to direct it in a position which will allow the emitted milk to be directed in a path for injestion. The tongue thus plays little or no part in the actual sucking process. Rather, it is a guide, bracer and stabilizer for supporting the nipple in the proper position for injestion of the milk. The alternating suction and pressure created by the infant during nursing will effect extraction of the milk from the human breast. This forceful milking motion (i.e., suction and pressure) has been estimated to be about sixty times the energy expended during artificial feeding. The conventional nipple, with its large outlet requires light sucking to effect milk intake. It will readily be apparent that the aforementioned forceful milking action exercises, develops and encourages mandibular growth. On the other hand, the inactivity resulting from the light sucking of the conventional nipple encourages inactivity of the mastication muscles and hinders mandibular growth and development and encourages, in later life, a lazy, chopping bite. In addition, the great quantity of milk which the conventional nipple makes available to the infant, invites the infant to resort to a tongue thrust against the nipple to regulate the flow therefrom. The human nipple, too, is quite small as compared with the often larger mass of the conventional nipple placed in the infant's mouth. Such a mass can result in actual deformation of the soft bone and various forms of malocculsions and "open bite" problems are traceable thereto.

It is an object of the present invention to provide a nipple which will closely approximate the natural conformation of the human nipple in breast feeding.

Another object of the present invention is the provision of a nipple which will develop proper swallowing habits and encourage muscular development of the oral and masticular structures of the infant.

A further object herein is the provision of a nipple which will minimize tongue thrust, finger sucking, lisping and like oral abnormalities traceable to the use of artificial nursing appliances.

Still another object herein is to provide a nipple which will regulate the flow of milk so as to alternatively permit and interrupt its flow during feeding to simulate the natural feeding at the mother's breast.

Another object of this invention is to provide a nipple which is simple to manufacture, inexepnsive to fabricate and durable in construction.

In general, achievement of the foregoing aims, objects and advantages of the present invention is accomplished by the provision of a collection and/or storage chamber for accumulation of milk. Such chamber retains the milk in much the same fashion as would the lactiferus sinus, in the human breast. An upper chamber or teat portion of the nipple is provided with an outlet aperture and is especially constructed so as to simulate the firmness of its counterpart in the human breast, and to restrict the tongue action of the infant whereby the infant tongue will be directed to the teat to guide and direct the emitted milk for injestion. Connecting the storage chamber and the teat portion of the nipple, an aperture is provided for the flow of the milk from the collection chamber to the upper chamber or teat, such flow of milk being regulated by an internally disposed partition which alternately closes and opens the aperture in response to the pressure and suction applied by the infant during feeding. Additional provision is made for fitting the nipple of the present invention on a conventional nursing bottle so as to be secured against removal therefrom.

Further provision is made in the present invention for the continuation of exercise of the various structures of the infant when not actually engaged in food intake. Provision is made for the utilization of the structural elements of the nipple in an exerciser, so that the infant may be availed of the anatomical structures during periods when food injestion is not primary.

Other objects, advantages and inventive characteristics of the present invention will be apparent to those versed in the art from the following description of the invention as illustrated in the drawings wherein like characters designate like parts in the several views and in which.

Figure 1:
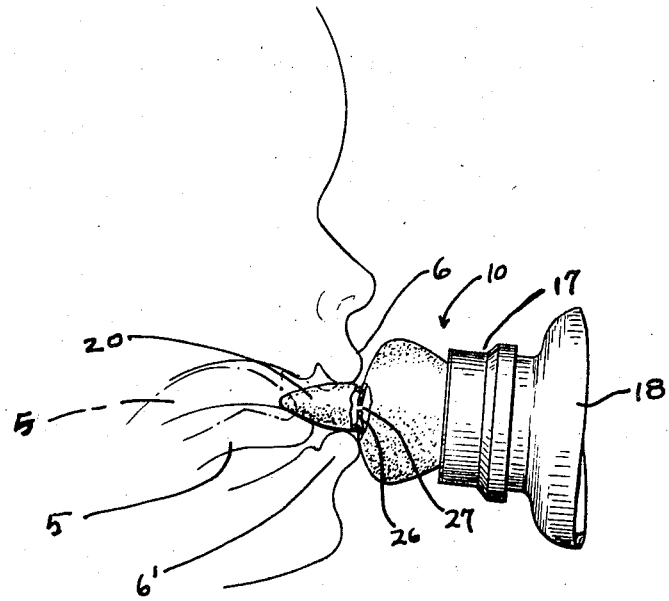
FIG. 1 is a side elevational view of the nipple shown in the mouth of an infant prior to compression by the infant as by biting, and showing attachment of the nipple to a conventional nursing bottle.
Figure 2:
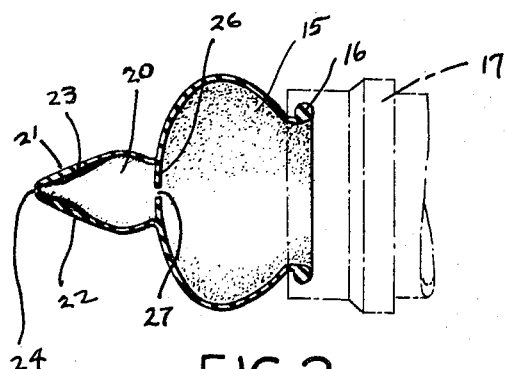
FIG. 2 is a sectional view of the nipple as it appears when not in use.

Referring now to the drawings, the nipple 10 according to the present invention is fabricated of rubber, plastic or other resilient material which may be received within the mouth of an infant as illustrated in FIG. 1. The nipple 10 is comprised of a substantially bulbous fluid storage chamber 15 for containing milk therein flowing from the conventional nursing bottle 18. Said bulbous chamber 15 is provided with a collar 16 for placement within a conventional annular threaded sealing member 17 which is adapted to be secured to a nursing bottle 18. An upper chamber or teat 20 is especially constructed so as to assume a substantially tapered elliptical cross-sectional configuration yielding an upper and lower arcuate surface 21 and 22 respectively. Said teat 20 is provided with a thickened area 23 toward its peak, and terminates in an outlet aperture 24 for the escape of fluid. It will be noted that the base 25 of teat 20 is substantially smaller in circumference than the bulbous chamber 15 so that the lips 6, 6' of the infant may be comfortably disposed against chamber 15 while the teat portion 20 of the nipple is disposed within the mouth of the infant. It will further be noted that the relative size of teat 20 is such that when it is received within the mouth of the infant, it will allow ample clearance of tongue 5.

Figure 3:
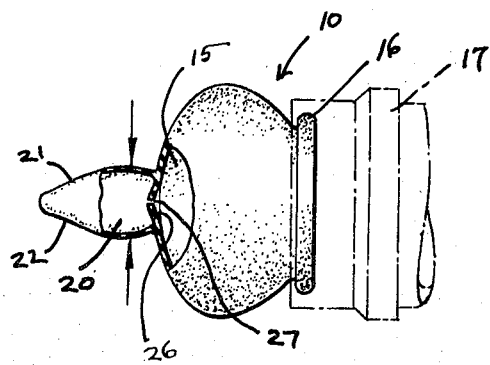
FIG. 3 is an elevational view, partly in section, illustrating the nipple in a partially compressed position.
Figure 4:
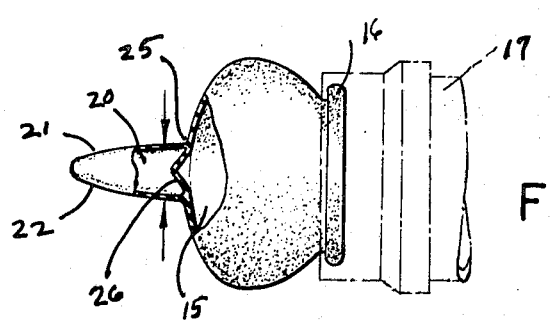
FIG. 4 is an elevational view, partly in section, showing the nipple fully compressed.
Figure 5:
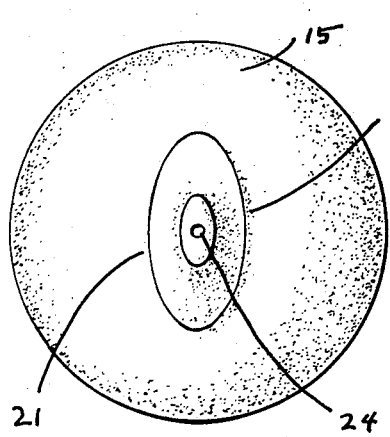
FIG. 5 is a top plan view of the nipple.
Figure 6:
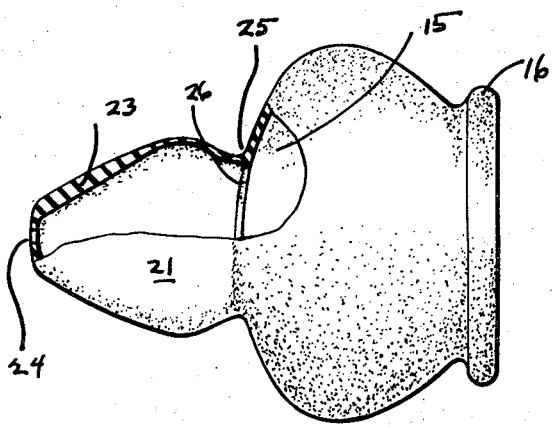
FIG. 6 is a vertical elevational view of the nipple.
Figure 8:
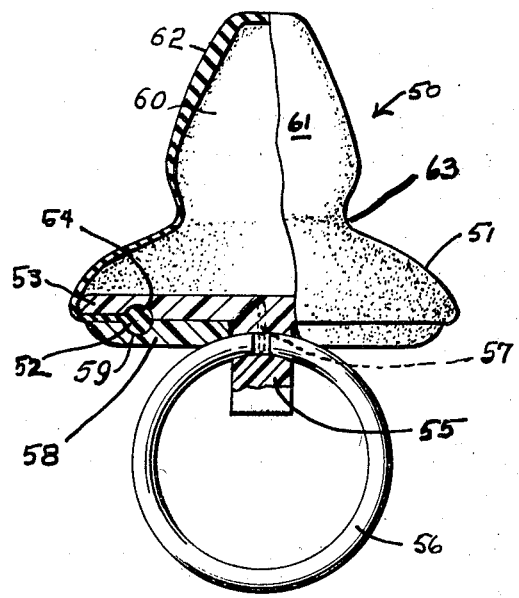
FIG. 8 is a view of the exercise according to the present invention.
Figure 7:
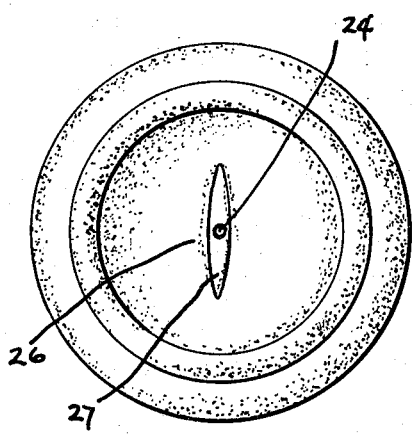
FIG. 7 is a bottom view of the nipple.

Separating chamber 15 and teat 20, there is provided a laterally disposed internal partition 26 which, when in normal nondistorted position, has a centrally located aperture 27. Said partition 26 effectively seals aperture 27 when pressure, as by biting, is applied by the infant to base 25 of chamber 20, as illustrated in FIGS. 3 and 4. As will be seen from the foregoing, milk is collected in chamber 15 and such milk will flow through aperture 27 into teat 20. As the infant bites down at base 25, partition 26 effectively seals off the milk from entering the teat 20 until the prior supply of milk is directed into the mouth by the tongue, and the jaws of the infant are once again opened. It will be noted that the position of the tongue 5 as shown in dot and dash lines in FIG. 1 is such as to direct the teat portion of the nipple to assume a position so as to allow the emitted milk to be directed in a path for injestion as is normal in the natural nursing pattern.

The exerciser 50 of the present invention is fabricated of a resilient material and comprises a bulbous chamber 51 at the bottom of which is a collar 52. Within collar 52 there is provided a substantially rigid disc 53 having a channel 54 along the undersurface thereof for receiving collar 52 therein. A downwardly extending member 55, extends centrally from disc 53 and provision is made for appending a ring 56 thereto. A vent 57 extends vertically the length of the downward member 55 so that air may enter chamber 51 to prevent its collapse when bitten by an infant. A complementary disc 58 with a channel 59, for locking collar 52 therein when said disc 58 is faced with disc 53 forms an anchor for exerciser 50 and holding means for the infant. The upper chamber or teat 60 assumes a substantially tapered elliptical cross-sectional configuration and is provided with substantially arcuate surfaces (one of which is shown) 61. Teat 60 has a thickened area 62 toward its peak and a substantially narrowed circumferential base area 63 where the lips of the infant are disposed during use thereof.

Although the present invention has been described with respect to the embodiments shown, it is understood that the present invention is not limited to that described and illustrated but various modifications may be made without departing from the spirit and scope of the invention.

I claim:

1. A nursing nipple for a nursing bottle comprising, a hollow thin pliant bulbous chamber having a uniform wall thickness throughout and an opening at the bottom end for receiving a quantity of liquid therein, a hollow tapered elliptical teat member connected at the forward end of said chamber for receiving liquid therefrom, said teat member having an outlet at its forward peak portion remote from its juncture with said bulbous chamber, said teat member having a wall thickness at the peak substantially greater than any other portion of the teat to provide a substantially rigid non-compressible tip adapted to form a tongue support for an infant, an internal thin flexible partition extending across the juncture between said bulbous chamber and teat member, said partition having a small central aperture extending therethrough for providing liquid communication between said bulbous chamber and said teat member, said aperture being open when the partition is in a passive state and being responsive to lip pressure of an infant applied at the juncture point to deflect said partition towards said teat member and close said aperture, and means for securing said nipple to a nursing bottle.

References Cited

UNITED STATES PATENTS

| | | | |
|---|---|---|---|
| 2,219,604 | 10/1940 | Trotter | 128—252 XR |
| 2,442,656 | 6/1948 | Less | 128—252 |
| 2,774,500 | 12/1956 | Budiani | 128—252 XR |
| 2,960,088 | 11/1960 | Witz | 128—252 |
| 3,082,770 | 3/1963 | Straub | 128—252 |

RICHARD A. GAUDET, *Primary Examiner.*

RONALD L. FRINKS, *Assistant Examiner.*

U.S. Cl. X.R.

128—360